United States Patent [19]

Bartlett

[11] Patent Number: 5,020,381
[45] Date of Patent: Jun. 4, 1991

[54] WEB TENSION MONITOR

[76] Inventor: Edward C. Bartlett, 447 Sixth St., Dover, N.H. 03820

[21] Appl. No.: 481,313

[22] Filed: Feb. 20, 1990

[51] Int. Cl.⁵ .................................................. G01L 5/10
[52] U.S. Cl. .................................................. 73/862.48
[58] Field of Search ...................................... 73/862.48

[56] References Cited

U.S. PATENT DOCUMENTS 3,260,106  7/1966  Hull et al. .
3,296,857  1/1967  Kaczeus .
4,052,891 10/1977  Bartlett .
4,735,102  4/1988  Koenig ............................. 73/862.48
4,784,004 11/1988  Ekola .

Primary Examiner—Charles A. Ruehl
Attorney, Agent, or Firm—Kenway & Crowley

[57] ABSTRACT

A web tension monitoring system in which a guide roll is supported for rotation upon bearings which are mounted on stub shafts extending inwardly from frame members. Load cells which include strain gauges are cantilever-mounted adjacent the internal ends of said stub shafts within the guide roll. Guide rolls and frame spacing of different lengths are accommodated by adjustable casing sleeves which permit variation of the amount of insertion of the stub shafts into the guide roll without affecting the operation of the load cells. Adaptors are provided to permit the use of guide rolls of differing diameters.

4 Claims, 2 Drawing Sheets

WEB TENSION MONITOR

This invention relates in general to the monitoring of tension in a moving web and in particular to an improved system which is self-adjusting to compensate for support frame spacing and misalignment, as well as guide roll loading.

BACKGROUND OF THE INVENTION

In various industries, continuous monitoring of tension in a web which may be moving at high speed is essential to avoid damage to the web or to maintain proper manufacturing controls on web-supported products. For example, in the manufacture of paper, endless webs are frequently used, and if tension is insufficient, the web tends to wrinkle, forming irregularities in the material being carried by the web. Conversely, if tension becomes too great, the web or product may be weakened or destroyed. In many other applications, such as printing and textile manufacturing, it is necessary to continuously observe and make necessary adjustments to maintain tension on a web within suitable limits.

Numerous systems have been devised for such tension monitoring. One such system is exemplified in U.S. Pat. No. 3,260,106, in which the web is passed over a guide roll and exerts displacing forces upon that guide roll. The guide roll is mounted for rotation upon a support shaft, and the force exerted by the tensioned web upon the guide roll causes deflection of the support shaft which is sensed by a strain gauge or gauges.

SUMMARY OF THE INVENTION

In the present invention, the tension exerted by a moving web upon a guide roll is measured by continuously sensing the displacement force applied to the guide roll as it rotates. This basic technique is old in the art and considerable effort has gone into the improvement particularly of the force-sensing devices. In the present invention, unlike some of the prior art mechanisms, no support shaft extending through the length of the guide roll is employed. Rather, stub shafts which may be mounted in pillow blocks or directly supported by frame members, extend into the ends of a hollow guide roll, self-aligning bearings being interposed between the stub shafts and the guide roll to permit rotation. Well within the guide roll adjacent the inner end of one or both of the stub shafts, a transducer load cell is fixed within a casing and isolated from the guide roll by the self-aligning bearing.

A wide range of adjustments may be made without changing the loading moment between the self-aligning bearing and the load cell. This is made possible by forming matching shoulders on the inside wall of the guide roll and the outside wall of the casing which permit variation of the setting of the guide roll axially relative to its supports. Also, guide rolls of differing diameters may be accommodated by adaptors in the form of sleeves of differing thicknesses which may be inserted between the inner surface of the guide roll and the outer surface of the casing which encloses the load cell. Axial expansion of either the stub shaft or the guide roll is accommodated without effect upon the load cell by a spring ring bearing upon the end of the guide roll and fixed to the end of the outer bearing retainer. Rubber O-rings are interposed between the outer casing of the transducer and the inner surface of the guide roll. These rings provide sufficient friction to cause the transducer casing to rotate under normal conditions with the guide roll. Under emergency conditions, such as might occur with a bearing freeze, the friction of the rubber rings is overcome and the guide roll turns relative to the transducer casing.

The load cell consists of two double cantilever-mounted sensors, and its output varies with loading in the direction perpendicular to the cell; that is, loading caused by the web in its passage over the guide roll. The rubber rings noted above isolate the load cell from vibrations which occur during operation and which would otherwise work-harden the load cell and cause it to fatigue.

For a better understanding of the invention, together with other objects, features and advantages, reference should be made to the following description of a preferred embodiment which should be read with reference to the appended drawing in which:

FIG. 1 is a view partly in section and partly cut away of a portion of a guide roll with the monitoring and support apparatus axially; and FIG. 2 is a fragmentary view of an alternative embodiment showing the use of adaptors for differing guide rolls.

DESCRIPTION OF THE PREFERRED EMBODIMENT

Figure 1:
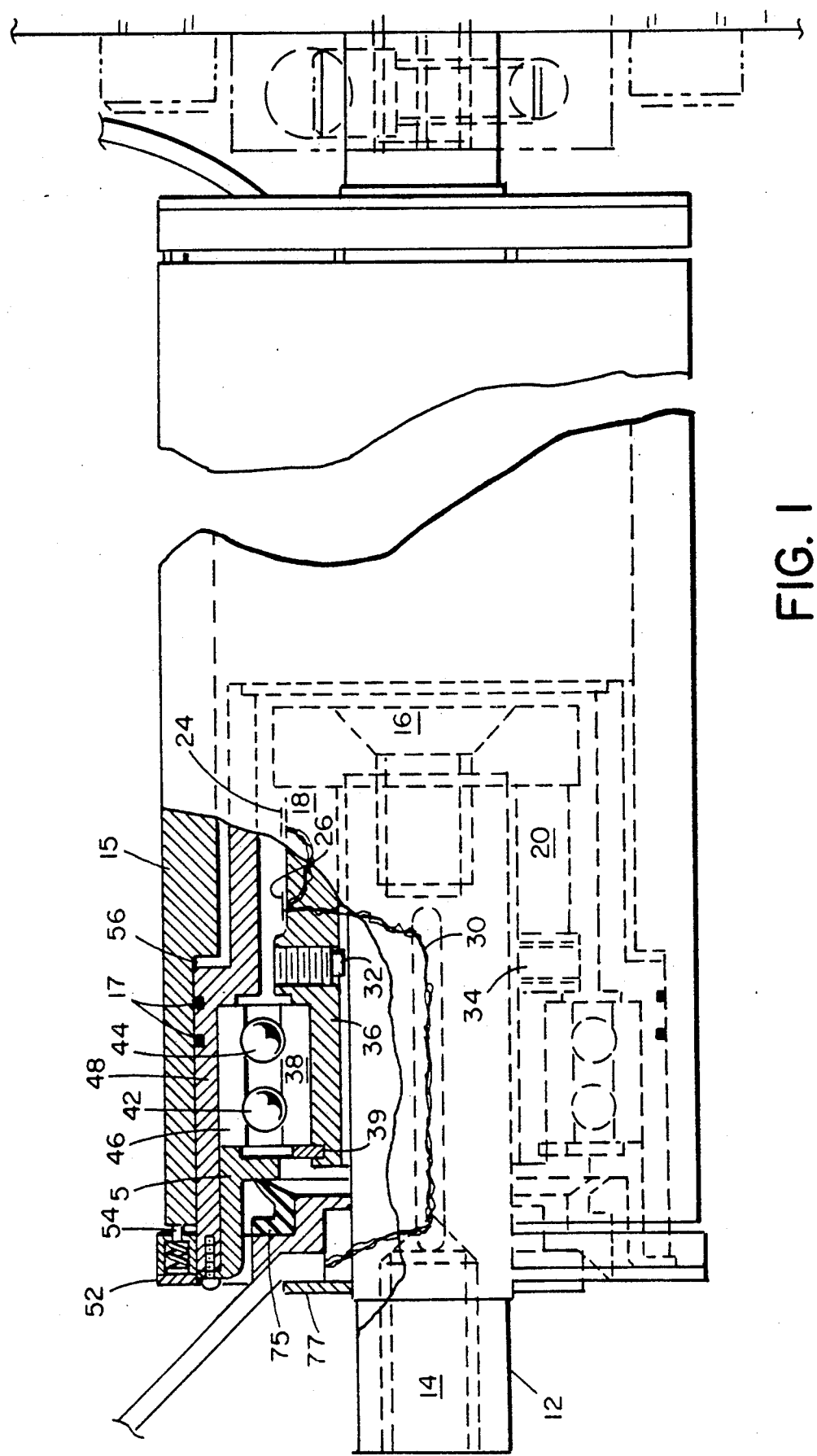

In FIG. 1 of U.S Pat. No. 4,052,891 granted Oct. 11, 1977 to the applicant here, there may be seen continuously moving webs passing over guide rolls. Between the guide rolls, a tension-monitoring roll 16 is positioned in such a fashion that the web passing under the guide rolls exerts a downwardly directed force upon the monitoring roll. The force exerted on the monitoring roll is a function of tension in the web and it is transmitted to a stub shaft which is mounted on a frame member. Sensors (not shown) are mounted on the stub shaft, and connections are made to suitable electrical circuitry to display continuously the amount of tension in the web or to provide a feedback signal to correct or modify web tension as desired.

The present invention may be incorporated in similar apparatus and detail, including internally mounted elements of the system, is shown in FIG. 1. A stub shaft 12 may be fixed to a suitable frame member by a screw 14. At the opposite end of the stub shaft 12, a load cell is end-mounted, preferably by a screw 16. The load cell includes two diametrically oppositely disposed arcuate beams 18 and 20 on which surfaces are turned on the upwardly-facing portion of the beam 18 and on the downwardly-facing portion of the beam 20. Sensors in the form of semiconductor strain gauges are mounted on the beam surfaces, typical strain gauges 24 and 26 being seen on the upwardly facing surface of the beam 18. Comparable and similar elements on the surface of the beam 20 are not seen in this view. Electrical leads from the strain gauges such as those shown at 30 extend through a groove formed in the core of the stub shaft 12 and emerge adjacent the frame on which the stub shaft is mounted.

To limit the movement in the vertical plane as shown in FIG. 1, oppositely disposed limit screws 32 and 34 are provided. Similar limit screws may be employed in the horizontal plane. These screws are threaded into the beam support member adjacent a cylindrical extension 36 thereof. An inner bearing race 38 is fixed to the outer surface of the extension 36 and is held in place by a snap ring 39 fitted into a groove formed in the extension 36. The bearing is of the self-aligning type and also includes rings of balls 42 and 44 as well as an outer bearing race 46. The outer bearing race 46 is fitted into a cylindrical transducer casing 48 and is held in place by a bearing retainer 50 which is attached to the end of the transducer casing 48 which is fitted into a guide roll 15 and is frictionally engaged therein by rubber O-rings 17. A spring-ring 52 which includes a hollow ring fastened to the end of the casing 48 has spring-loaded pistons 54 bearing against the end of the guide roll. The spring-ring assembly is designed to permit expansion and contraction of the guide roll 15 and the casing 48 without affecting the operation of the load cell.

The stepped cylindrical shapes of the housing and the guide roll form matching shoulders adjacent the gap 56 and permit axial expansion of the roll with full insertion of the load cell sensing unit. The casing 48 may be adjusted in its axial position relative to the roll to match guide rolls and frame spacings of differing lengths. As a final step, the spring ring may be slid into position against the guide roll end and locked in place. These adjustments and accommodations can be made without changing the loading distance to the load cell.

Figure 2:
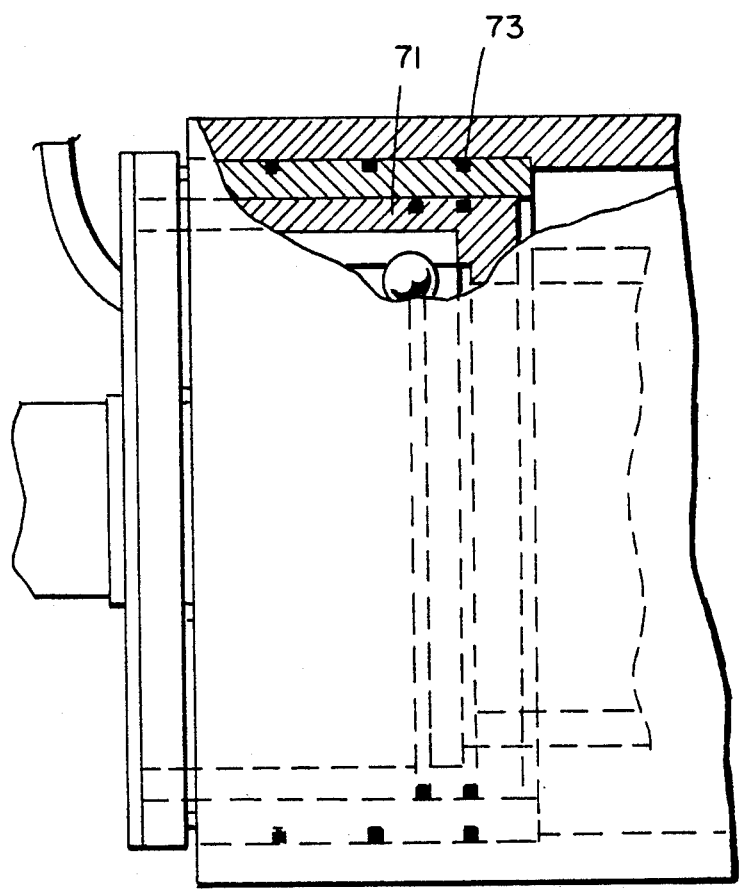

In FIG. 2, fragmentary detail is shown to illustrate the use of adaptors when it is desired to accommodate guide rolls of larger diameter. The adaptors are cylindrical sleeves in the outer peripheral surface of which a plurality of grooves are formed. Rubber O-rings are disposed in the grooves, the groove and O-ring 73 being typical and visible here By using adaptors of differing thicknesses, a wide range of sizes of guide roll may be utilized with a given support system. Also, as noted above., the extent of insertion of the transducer casing into the end of the guide roll may be adjusted to accommodate differing lengths of guide roll and spacings between frame members. Also, the use of the self-aligning bearing permits a degree of misalignment between frame members or rotational mismatching which may exist without creating any error in the transducer which is isolated at the end of the cantilever mount.

The use of a pair of double cantilever mounted gauges provides four areas sensing the same loading force. Each area may be gauged in such a fashion that a broad range of sensitivity is achieved and a single transducer unit can cover forces ranging from very low to very great magnitudes. Also, the multiple units may be so arranged as to provide temperature compensation, cancelling out the effect of heat generated during operation which tends to be transferred to the load cell.

The spring-loaded pistons 54 in the spring-ring 52 allow the guide roll or the stub shaft to expand or contract axially without affecting the output of the transducer. The only resistance to differential expansion axially is provided by the spring ring which tolerates the expansion or contraction without effect upon the output of the load cell. At the same time, however, the spring-ring 52 prevents the guide roll from shifting from side to side. The rubber rings interposed between the casing of the transducer and the guide roll provide sufficient friction to keep the transducer from turning relative to the guide roll under normal circumstances. However, if the bearing freezes or if for any other reason jamming occurs, the transducer will rotate within the guide roll without damaging the load cell. The rubber rings also serve to isolate the load cell from harmful roll vibration which can interfere with the precision and accuracy of its operation and its useful life. A dust seal 75 and end cap assembly 77 serve to prevent the entry of foreign material into the structure.

What is claimed is:

1. In a system for monitoring the tension in a web traveling over a guide roll mounted for rotation about a pair of stub shafts, a load cell cantilever-mounted on one of said stub shafts including diametrically oppositely disposed beams of arcuate cross-section and a plurality of gauges, two of said gauges being disposed in axially spaced relationship on each of said arcuate beams, a self-aligning bearing for said guide roll including an inner bearing race normally non-rotating about said one stub shaft, bearing balls, and an outer bearing race normally rotatable with said guide roll, said load cell being disposed within said guide roll inwardly of said bearing, whereby tension exerted by said web on said guide roll causes strain on said load cell to produce a signal in response thereto.

2. In a system as defined in claim 1, the combination which includes a cylindrical casing enclosing said load cell, matching shoulders being formed on the outer wall of said casing and on the inner wall of said guide roll whereby the overall length of said guide roll and said casing may be varied.

3. In a system as defined in claim 2, the combination which includes a sleeve insertable between said casing and said guide roll and friction rings disposed between the outer surface of said sleeve and said guide roll and between the inner surface of said sleeve and said casing whereby said guide roll, said sleeve and said casing normally rotate in unison.

4. In a system as defined in claim 2, the combination which includes at least a spring-ring attached to the outer end of said casing and bearing against the adjacent end of said guide roll to permit differential axial expansion of said casing and said guide roll without affecting said load cell.

* * * * *